Figure 1:
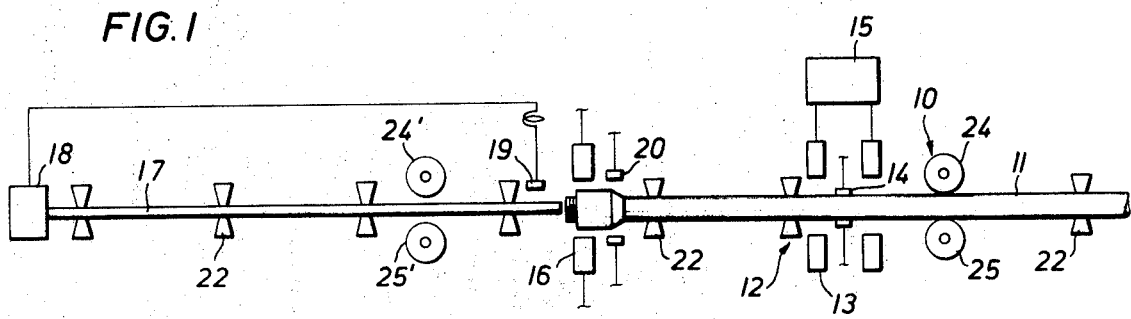

United States Patent

[11] 3,565,310

[72] Inventor  Gerald H. Hugonin
              Houston, Tex.
[21] Appl. No. 772,689
[22] Filed     Nov. 1, 1968
[45] Patented  Feb. 23, 1971
[73] Assignee  Schlumberger Technology Corporation
              New York, N.Y.

[54] APPARATUS FOR SELECTIVELY TRANSPORTING ELONGATED ARTICLES
     14 Claims, 5 Drawing Figs.
[52] U.S. Cl. .................................................. 226/34,
                                                           226/176
[51] Int. Cl. ................................................. B65h 23/18
[50] Field of Search ....................................... 226/34,
                                        176, 177, 186, 187; 198/167

[56]           References Cited
               UNITED STATES PATENTS
3,263,284  8/1966  Orr .......................... 226/176X
3,371,770  3/1968  Graham ..................... 226/176X Primary Examiner—Richard A. Schacher
Attorneys—Ernest R. Archambeau, Jr., William J. Beard, David L. Moseley, Edward M. Roney and William R. Sherman ABSTRACT: As a preferred embodiment of the invention disclosed herein for axially transporting elongated members along a selected axis, a plurality of rollers spaced about this axis are cooperatively arranged to engage spaced exterior portions of an elongated member, such as a joint of pipe and the like. At least two of these rollers are adapted to contact opposed surfaces of the elongated member with one or both of these opposed rollers being selectively powered for frictionally driving the transported member along this selected path. At least one of the opposed rollers is adapted to move transversely in relation to the transported member and is cooperatively associated with force-developing means operatively arranged for selectively urging the movable roller with sufficient lateral force against the transported member to secure positive traction between the transported member and the driving roller. Control means are also provided for actuating the movable roller soon after the transport member has moved into engagement with the opposed rollers so as to not hinder the movement of the transported member along the selected path.

Gerald H. Hugonin
INVENTOR

Gerald H. Hugonin
INVENTOR

BY
*J. R. Archambeau Jr.*
ATTORNEY

APPARATUS FOR SELECTIVELY TRANSPORTING ELONGATED ARTICLES

As pointed out in the Tompkins U.S. Pat. No. 3,287,632, it is fairly common to magnetically inspect elongated ferromagnetic tubular members such as joints of drill pipe and oilfield tubing for flaws and defects that may affect their utility. To perform these inspections in an efficient manner, a pipe that is to be inspected is first subjected to a longitudinally-oriented magnetic field so that generally transverse flaws in the pipe may be located by means of suitable flux-responsive measuring devices. Then, in many instances, the pipe is subjected to a circumferentially-oriented magnetic field for detecting generally longitudinal flaws that may exist in the pipe.

To conduct these inspections, generally horizontal conveyors with pipe-engaging rollers are typically employed to axially transport the joints of pipe to be inspected back and forth through the inspection apparatus. One typical arrangement employs powered rollers disposed along the conveyor that simply support the pipe sections and depend solely upon the weight of the pipes to secure sufficient driving traction. With this arrangement, however, sufficient traction cannot be reliably maintained with the smaller-diameter—and relatively lighter—joints of pipe. Another arrangement employed heretofore for selectively moving pipe sections through the inspection apparatus includes several sets of opposed driving rollers (as shown generally at 12 and 18 in the aforementioned Tompkins patent) spaced along the conveyor. By urging these opposed rollers tightly against the opposite sides of a pipe therebetween and cooperatively counterrotating them, pipe sections are passed back and forth through the inspection apparatus.

With the opposed driving rollers arranged in this manner, the driving rollers usually must be urged against the pipe sections with considerable force to be certain that sufficient driving traction is always maintained. These biasing forces must, of course, be substantially increased where the pipe sections have oil, mud, or water on their exterior surfaces. Although this arrangement provides sufficient driving traction once a pipe section is between the opposed rollers, such high biasing forces on the rollers make it difficult, if not impossible at times, to interject the leading end of an advancing pipe section between the opposed rollers without some additional driving force. For instance, when typical joints of drill pipe are being inspected, the upset or enlarged-diameter end portions thereof frequently will not pass easily between these opposed rollers. Thus, considerable time is often needlessly wasted every time the leading ends of these pipe joints reach each of the two or more sets of opposed driving rollers typically spaced along the inspection axis.

Accordingly, it is an object of the present invention to provide apparatus for selectively transporting elongated articles along a selected path without the continued movement of such elongated articles therealong being hindered whenever abrupt forward surfaces thereon or their leading ends reach the transporting apparatus.

This and other objects of the present invention are attained by arranging at least two members adapted for cooperative rolling movement along opposed exterior portions of an elongated article to be transported along a selected path, with at least one of these two article-engaging members being operatively powered for frictionally driving the elongated article along this selected path. To assure positive traction with the elongated article, means are provided for relatively moving the opposed article-engaging members in relation to the transported article for selectively imposing a laterally-directed force thereon sufficient to maintain a corresponding frictional driving force. Control means are also provided for delaying imposition of this laterally-directed force until the leading end of the transported article has been interposed between the article-engaging members so that travel of the article along the selected path will not be hindered.

Figure 2:
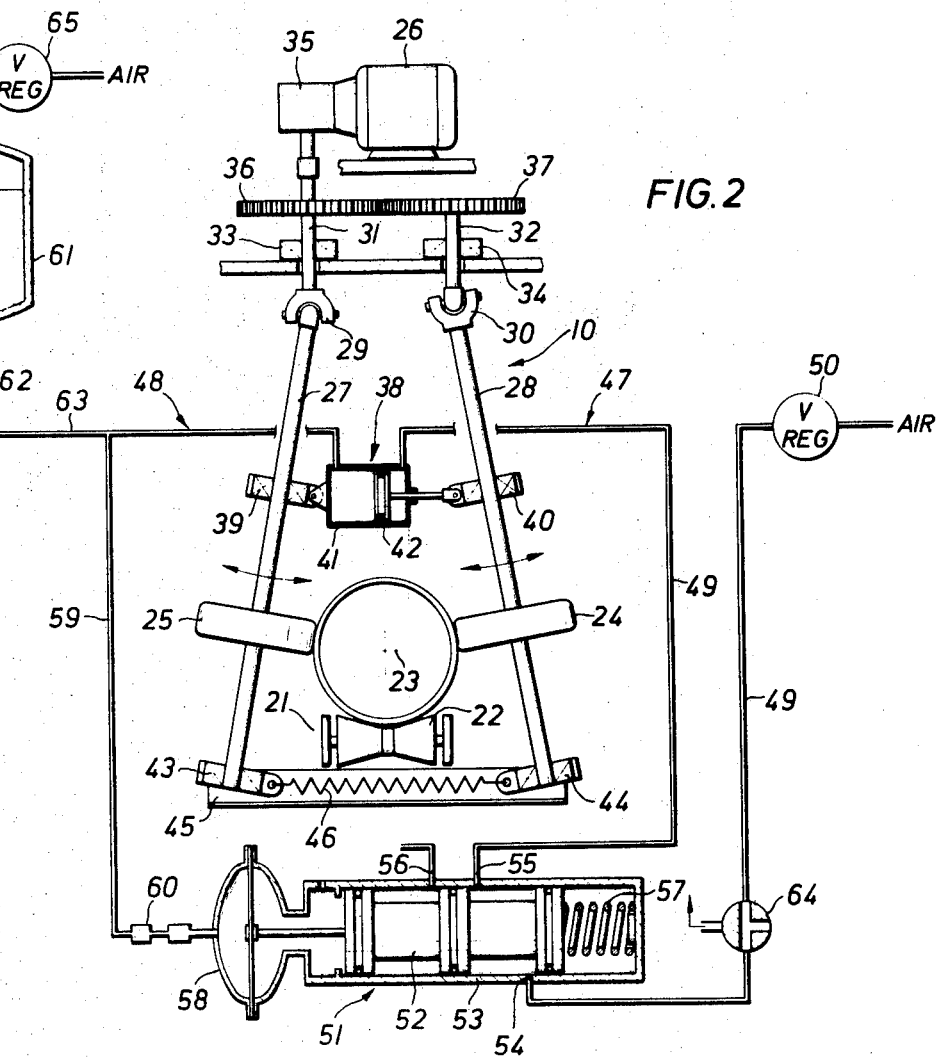
Figure 3A:
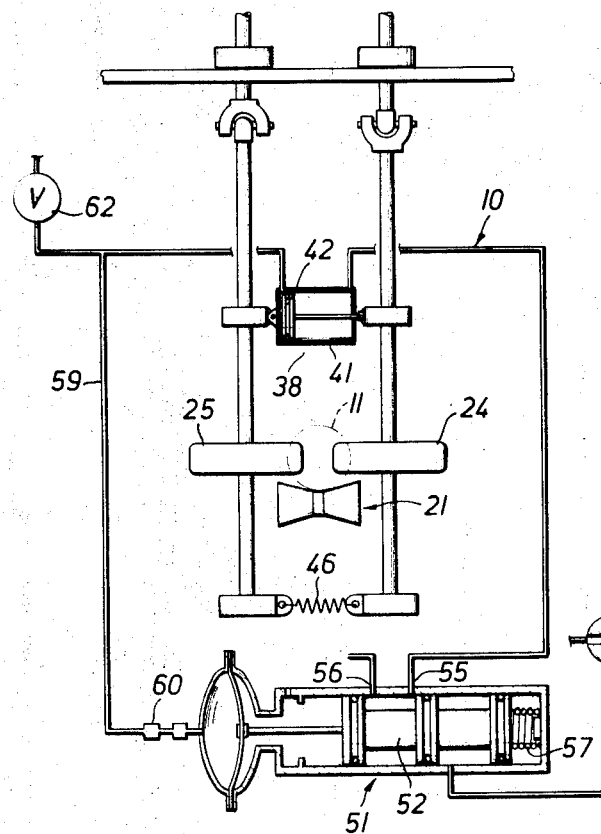
Figure 3B:
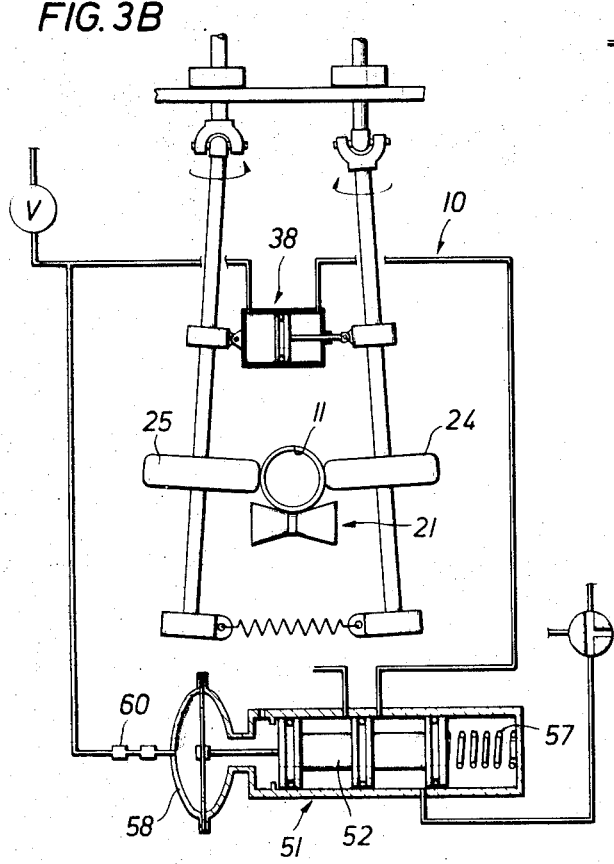
Figure 3C:
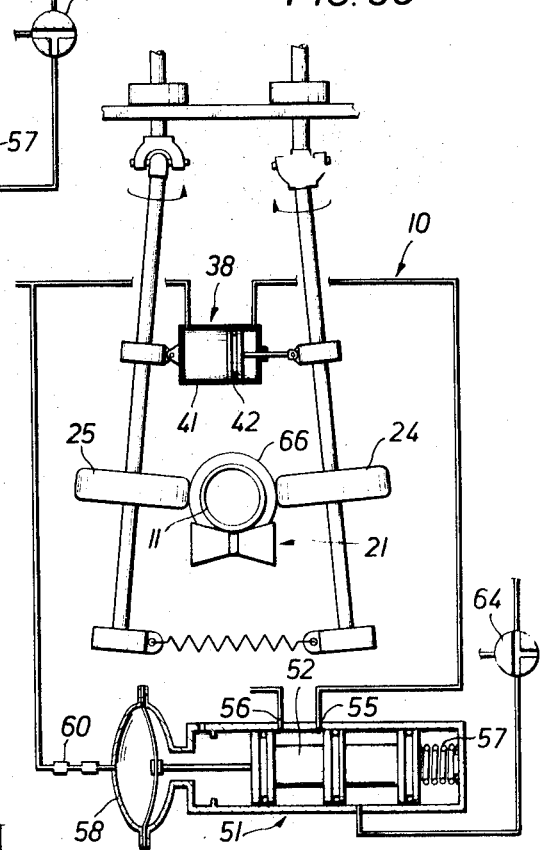

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 schematically illustrates apparatus arranged in accordance with the present invention arranged for cooperation with typical pipe-inspection apparatus;

FIG. 2 is a somewhat-schematic view of a preferred embodiment of the present invention; and FIGS. 3A—3C respectively depict successive operations of the apparatus illustrated in FIG. 2.

To illustrate one manner in which the present invention can be employed, a schematic plan-view is shown in FIG. 1 of apparatus 10 arranged in accordance with the present invention as it might be employed for selectively transporting elongated members, such as joints of pipe 11 or other tubular members, through flaw-inspection apparatus 12 such as that disclosed in the aforementioned Tompkins patent. Reference should be made, of course, to the Tompkins patent for elaboration of any details of the pipe-inspection apparatus 12 and the particulars of its operation. Thus, the forthcoming description is intended to briefly show in general the arrangement of the pipe-inspection apparatus 12 and a typical inspection operation therewith only so far as is necessary to bring out the full significance of the present invention.

In general, the inspection apparatus 12 is arranged to progressively induce longitudinally-oriented magnetic flux in a horizontal pipe, as at 11, being advanced axially in a first direction along the axis of the inspection apparatus so that transversely-oriented flaws in the pipe can be concurrently detected. Any residual magnetism remaining in the pipe 11 is at least partially reduced by progressively subjecting the advancing pipe to a demagnetizing flux after it has been inspected for transversely-oriented flaws. When generally longitudinally-oriented flaws are also to be detected, the pipe 11 is halted and then subjected to a circumferentially-oriented magnetic field. Thereafter, as this pipe 11 is returned in the opposite direction along the inspection axis, it is progressively inspected for longitudinally-oriented flaws. On the other hand, when no inspection is to be made for such longitudinally-oriented flaws, the pipe 11 is merely withdrawn from the inspection apparatus 12 so that other pipes can be inspected.

To perform these inspections, the pipe-inspection apparatus 12 includes an annular coil 13 that is concentrically arranged around the inspection axis to progressively induce a longitudinally-oriented magnetic flux in pipes moving through the coil. As pointed out in the Tompkins patent, it is preferred to divide the flux-inducing coil 13 into two longitudinally-spaced sections and arrange a plurality of flux-detecting heads 14 therebetween. In this manner, when the coil 13 is energized by a power source 15, the resulting longitudinally-oriented flux induced in a pipe moving therethrough will have a significant longitudinal dimension and the flux-detecting heads 14 will exhibit a greater sensitivity by being located at the approximate midpoint of this magnetic field. A second annular coil 16 is also concentrically arranged around the inspection axis to the rear of the flux-inducing coil 13. An AC source (not shown) is connected to the coil 16 and suitably arranged to progressively subject a pipe leaving the coil 13 to an alternating magnetic field for at least reducing any longitudinally-oriented residual magnetism remaining therein.

The pipe-inspection apparatus 12 further includes an electrically-conductive, cantilevered elongated probe or lance 17 that is supported at its remote end and maintained in substantially coincidental alignment along the inspection axis. As is more fully described in the Tompkins patent, a pipe that is to be inspected for longitudinal flaws is advanced onto the lance 17 until the lance has passed completely through the central bore of the pipe and its free end projects out of the rearward end of the pipe. To subject a pipe receiving the lance 17 to a circumferentially-oriented magnetic field, a DC source 18 is connected between the remote supported end of the lance and one or more laterally-movable electrical contacts 19 that are selectively engageable with the free end of the lance. A plurality of flux-detecting heads 20 are arranged for movement into contact with and coaxial rotation about a pipe for detecting generally longitudinal flaws therein as it is being withdrawn from over the lance.

It will be appreciated, therefore, from this brief description that the apparatus 10 of the present invention must be capable of axially translating elongated members such as the pipe 11 in either direction along the selected inspection axis. Moreover, the pipe-transporting apparatus 10 must be capable of maintaining these moving elongated members in a reasonable coincidental alignment with the inspection axis.

Accordingly, as best seen in FIG. 2, in its preferred form, the apparatus 10 of the present invention includes means, such as a conveyor 21 having a plurality of longitudinally-spaced transverse rollers 22 for contacting spaced portions of a pipe, adapted to movably support an elongated member such as the pipe 11 for axial movement along a selected axis 23. To selectively drive an elongated member along the conveyor 21, an opposed pair of rollers 24 and 25 (as will as at 24' and 25' in FIG. 1) are adapted to contact circumferentially-spaced longitudinal portions of the elongated member and to be urged or biased thereagainst with sufficient force so that whenever one or both of these rollers are rotatably driven, the elongated member will be propelled along the conveyor. Inasmuch as the rollers 22 on the conveyor 21 are appropriately arranged to vertically position an enlarged member supported thereon at the proper elevation to be aligned with the axis 23, the rollers 24 and 25 are arranged to contact the elongated member at substantially diametrically-opposed side portions thereof so as to laterally position the elongated member in relation to the axis. Moreover, to better accommodate different sizes of elongated members passing therebetween, both of the rollers 24 and 25 are respectively adapted for generally lateral or transverse movement in relation to the axis 23.

To selectively propel a pipe along the conveyor 21, motive means such as a typical selectively-reversible motor 26 is conveniently mounted above the conveyor and operatively coupled by suitable power-transmission means to depending shafts 27 and 28 respectively carrying the opposed rollers 24 and 25. Although this is not shown in the drawings, it will be understood that the rollers 24' and 25' are arranged and powered in the same manner as the rollers 24 and 25. As seen in FIG. 2, therefore, the roller shafts 27 and 28 are preferably pivotally supported by universal joints 29 and 30 carried by upright shafts 31 and 32 that are journaled and supported in suitable bearings 33 and 34 conveniently mounted below the motor 26. To couple the upright shafts to the motor 26, a right-angle gear-reduction unit 35 on the motor is coupled to one of the shafts 31 to drive a gear 36 on this shaft that is complementally coengaged with an identical gear 37 on the other shaft 32. Accordingly, upon operation of the motor 26, it will be recognized that the rollers 24 and 25 will be driven at the same speed but in opposite rotative directions so as to propel an elongated member between the counterrotating rollers in a desired direction along the conveyor 21.

It will, of course, be appreciated that to propel an elongated member along the conveyor 21, the driving rollers 24 and 25 must be frictionally engaged with the elongated member. Moreover, since the interacting frictional forces between the elongated member and the driving rollers 24 and 25 are directly proportional to the biasing forces holding the rollers against the elongated member, the apparatus 10 of the present invention further includes means for selectively urging the driving rollers against an elongated member therebetween. Thus, in the preferred manner of developing forces for urging the driving rollers together, a typical double-acting piston actuator 38 is suspended between the depending shafts 27 and 28 and operatively coupled thereto for selectively moving the rollers 24 and 25 laterally in relation to the axis of movement 23. To couple the piston actuator 38 to the depending shafts without hindering their rotation, bearings 39 and 40 are respectively mounted at intermediate locations on the shafts 27 and 28 and the piston cylinder 41 is connected to one bearing and the piston member 42 is connected to the other bearing. Bearings 43 and 44 are also respectively mounted on the lower ends of the depending shafts 27 and 28 and cooperatively associated with a transversely-directed guide 45 for limiting movement of the shafts and their respective rollers 24 and 25 to a selected transverse plane crossing the axis 23. Means, such as a stout spring 46 connected between the lower bearings 43 and 44, are provided to normally urge the rollers 24 and 25 toward one another.

It will be recognized, of course, that by introducing a pressured fluid into the right-hand end (as viewed in FIG. 2) of the piston cylinder 41, the piston actuator 38 will be effective to urge the opposed rollers 24 and 25 inwardly against the elongated member or pipe 11 on the conveyor 21 with forces commensurate with the pressure of the pressured fluid. This alone would, of course, be adequate to maintain a desired traction force between the driving rollers 24 and 25 and an elongated member passing therebetween once the member has entered between the rollers. However, as previously discussed, whenever the leading end of an elongated member first reaches the driving rollers 24 and 25, further movement of the elongated member would at least be slowed, if not halted altogether, if the biasing force is substantial.

Accordingly, in keeping with the objects of the present invention, control means 47 and 48 are also included with the new and improved apparatus 10 and respectively adapted for maintaining a desired traction force on the driving roller or rollers as well as for selectively delaying imposition of this traction force until the leading end of an advancing elongated member has moved between the opposed rollers 24 and 25. To develop a selected traction force on the rollers 24 and 25, the control means 47 include a source (not shown) of a suitable pressured fluid (such as compressed air) that is connected by a conduit 49 to the right-hand end of the piston cylinder 41 for urging the opposed rollers together. A selectively-adjustable control or pressure regulator 50 is also provided in the conduit 49 to enable the pressure in the piston actuator 38 to be selected as required to maintain a desired traction force.

To temporarily delay the development of the inwardly-directed lateral forces imposed on the driving rollers 25 and 25, the control means 48 include means, such as a control valve 51, for selectively controlling flow communication through the conduit 49 to and from the piston actuator 38. As shown in FIG. 2, in its preferred style, the control valve 51 has an axially-movable spool 52 operatively disposed in a valve body 53 for movement therein between a first position (as illustrated) for establishing flow communication through the conduit 49 and a second position somewhat to the right of the illustrated position. Thus, when the valve spool 52 is in its illustrated position, inlet and outlet ports 54 and 55 in the valve body 53 are in communication with one another to permit free flow of pressured fluid from the pressure regulator 50 to the piston actuator 38. Upon movement of the valve spool 52 to the right of its illustrated normal position, however, the inlet port 54 is isolated and the outlet port 55 is placed into communication with a normally-isolated exhaust port 56 in the valve body 53 to temporarily disable the piston actuator 38. Means, such as a compression spring 57, are provided to normally urge the valve spool 52 to its illustrated position.

The control valve 51 further includes actuating means that are selectively operable for moving the valve spool 52 to its alternate position against the spring 57 when it is desired to relieve the pressure of the pressured fluid acting on the piston actuator 38. As schematically represented in FIG. 2, in the preferred embodiment of the present invention, pressure-responsive means, such as a typical diaphragm actuator 58, are employed to shift the valve spool 52 to its alternate position. Thus, as will be appreciated from the drawings, introduction of a pressure-transmitting medium into the enclosed space of the diaphragm actuator 58 will be effective to urge the valve spool 52 toward the right-hand end of the valve body 53 to place the ports 55 and 56 into communication and isolate the inlet port 54. The pressure-responsive diaphragm actuator 58 is connected by a conduit 59 to the left-hand end (as viewed in the drawings) of the piston cylinder 41. For reasons that will subsequently become apparent, a flow restrictor 60 is included in the conduit 59; and a vessel 61 of a suitable fluid is connected by way of a normally-closed valve 62 and a branch conduit 63 to the conduit 59.

Accordingly, it will be appreciated that when the left-hand end of the piston actuator 38, the conduit 59, and the enclosed space of the diaphragm actuator 58 are filled with a suitable pressure-transmitting medium (preferably oil, water, or some other relatively-incompressible liquid), relative movements between the piston 42 and piston cylinder 41 will vary the volume of the pressure-transmitting medium in the piston actuator and produce an inverse but corresponding volumetric change in the enclosed diaphragm space. Thus, movements of the piston actuator 38 tending to reduce the volume of the pressure-transmitting medium contained therein will correspondingly increase the volume of the pressure-transmitting medium contained in the diaphragm actuator 58 and, as a result, be effective to urge the valve spool 52 to the right-hand end of the valve body 53. Conversely, an increase in the volume of medium pressure-transmitting medium in the piston actuator 38 will allow the valve spring 57 to displace a corresponding quantity of the pressure medium from the diaphragm actuator 58 so that the valve spool 52 will be shifted a corresponding distance toward its normal position. It will be appreciated, therefore, that selective displacement of the pressure medium back and forth between the diaphragm actuator 58 and piston actuator 38 will enable the valve 51 to be selectively positioned in response to the relative spacing between the opposed driving rollers 24 and 25.

Turning now to FIGS. 3A—C, the new and improved apparatus 10 of the present invention is shown as it will appear at successive times during a typical operation. To ready the apparatus 10 as shown in FIG. 3A, the pressured fluid or compressed air is initially exhausted from the piston actuator 38 and control valve 51. Thus, be means of a typical three-way valve (as at 64) in the conduit 49, flow of the pressured fluid is temporarily blocked and any pressured fluid in the control valve 51 will be exhausted to atmosphere. Once the pressured fluid is temporarily removed from the piston actuator 38, the valve 62 is opened only long enough to admit a sufficient volume of the pressure-transmitting medium for filling the system. Introduction of the pressure-transmitting medium is conveniently accomplished by using an adjustable pressure regulator 65 (FIG. 1) for maintaining a so-called "air cushion" at a relatively-low pressure in the top of the vessel 61.

As shown in FIG. 3A, a sufficient quantity of the pressure-transmitting liquid will be admitted into the system to shift the valve spool 52 against the valve spring 57 far enough to open communication between the outlet and exhaust ports 55 and 56. This, of course, vents any any remaining pressure in the right-hand end of the piston cylinder 41. Although admission of the pressure-transmitting medium will tend to move the piston 42 out of the cylinder 41 against the opposing force of the spring 46, the valve 62 is closed when the driving rollers 24 and 25 have separated no further than a distance somewhat less than the diameter of the pipes 11 to be transported.

Once these initial preparations have been completed, the valve 64 is reopened and the pressure regulator 50 is adjusted as required to impose a selected lateral force on the driving rollers 24 and 25. This biasing force will, of course, be determined by experience as well as by the condition of the surfaces of the pipes 11 to be translated along the conveyor 21. Ignoring for the moment the operation of the apparatus 10 as the leading end of the pipe 11 moves between the rollers 24 and 25, as shown in FIG. 3B once the pipe is between the driving rollers, the valve spool 52 will have assumed a position allowing the pressured fluid or compressed air to enter the piston actuator and tightly urge the rotating drive rollers against the pipe. If necessary, the biasing forces can be readily varied by simply adjusting the pressure regulator 50. It should also be noted that any side movement of the pipe 11 on the conveyor 21 will not affect the control system since the rollers 24 and 25 will shift laterally corresponding distances and not reposition the piston actuator 38.

Turning now to FIG. 3C, the leading end of an advancing pipe section 11 is shown just as it enters between the rollers 24 and 25. As is typical with drill pipe and other oilfield tubular members, the end of the pipe 11 is upset, as at 66. It will, of course, be appreciated that before the upset end 66 has reached the rollers 24 and 25, the driving rollers will be in their initial relaxed position as shown in FIG. 3A. Similarly (with the exception of the valves 62 and 64), all other elements of the transporting apparatus 10 will be in the positions shown in FIG. 3A. It will also be realized that other driving rollers (such as at 24' and 25') will be propelling the pipe 11 along the conveyor 21 toward the illustrated transporting apparatus 10.

Accordingly, as the upset pipe end 66 is first moved between the driving rollers 24 and 25, the opposed rollers will, of course, be moved apart as illustrated in FIG. 3C. This outward movement of the opposed rollers 24 and 25 will, therefore, reposition the piston actuator 38 and would immediately produce a corresponding change in the position of the valve spool 52 if it were not for the slight delay in transferring the pressure-transmitting medium from the diaphragm actuator 58 to the piston actuator. It will be recognized, of course, that the orifice or flow restrictor 60 will provide means for selectively regulating the time delay between repositioning of the piston actuator 38 and the correlative response of the control valve 51.

Thus, although the entrance of the leading end 66 of the pipe 11 immediately repositions the driving rollers 24 and 25, no inwardly-acting biasing forces are applied to the opposed rollers until a sufficient volume of the pressure-transmitting medium has been displaced (by the action of the valve spring 57) from the diaphragm actuator 58 into the increased available space (to the left of the piston 42) in the piston actuator 38. Accordingly, so long as the valve spool 52 has not shifted sufficiently to intercommunicate the ports 54 and 55, the pressured fluid or compressed air is not admitted to the piston actuator 38 and no inwardly-acting force (except for the minor force supplied by the spring 46) is imposed on the rollers 24 and 25. This delay will enable other pipe-driving devices such as the rollers 24' and 25' or drive rollers (as at T and T' in the Tompkins patent) on the other racks ahead of or to the rear of the inspection apparatus 12 to continue advancing the pipe 11 until the illustrated driving apparatus 10 can begin propelling the pipe.

It will also be appreciated from FIG. 3B that a momentary outward or inward displacement of the opposed rollers 24 and 25 will not affect the traction force of the driving rollers. Thus, full traction will be retained until the trailing end of the pipe 11 has cleared the pipe-translating apparatus 10. Once the driving rollers 24 and 25 clear the trailing end of the pipe 11, they will relax and the system will again return to the position illustrated in FIG. 3A with the exception that the valves 62 and 64 will, of course, not be changed.

Accordingly, although changes and modifications may be made in the disclosed embodiment without departing from the principles of the present invention, it will be appreciated that the present invention provides new and improved means for selectively transporting axially-movable members. By assuring that the driving means are urged firmly against the members being transported thereby, sufficient traction will always be maintained. On the other hand, even where a substantial biasing force must be maintained on the members being transported to assure proper traction of the driving means, the present invention further serves to temporarily reduce or remove this biasing force so as to allow the leading end of an advancing member to easily clear the driving means without having to overcome this biasing force.

I claim:

1. Apparatus adapted for axially transporting elongated articles along a selected axis and comprising: means cooperatively arranged along a selected axis for axially transporting elongated articles along said axis and including at least two article-engaging members adapted for relative rolling movement along opposed longitudinal surfaces of such elongated articles, means operatively supporting said article-engaging members for transverse movement in relation to one another, and means adapted for rotatively driving at least one of said article-engaging members; first means normally positioning said article-engaging members at a relative separation less than the transverse spacing between such opposed surfaces of an elongated article advancing along said axis; and second means operable only upon further separation of said article-engaging members by such an advancing elongated article for biasing said article-engaging members inwardly against such opposed surfaces to frictionally propel that elongated article further along said axis.

2. The apparatus of claim 1 wherein said second means include: piston means adapted for biasing said two article-engaging members inwardly upon introduction of a pressured fluid thereto; valve means selectively operable for controlling admission of a pressured fluid to said piston means; and means responsive to relative outward transverse movement between said two article-engaging members for operating said valve means to admit a pressured fluid to said piston means only after both of said two article-engaging members are engaged with such opposed longitudinal surfaces of an elongated article advancing along said axis.

3. The apparatus of claim 1 wherein both of said two article-engaging members are transversely movable inwardly and outwardly in relation to said selected axis.

4. The apparatus of claim 3 wherein said second means include: piston means operatively coupled to said two article-engaging members; a fluid conduit adapted to supply a pressured fluid to said piston means for biasing said article-engaging members inwardly; valve means in said fluid conduit and selectively operable for controlling admission of a pressured fluid to said piston means; and means responsive to outward transverse movements of said article-engaging members upon initially contacting the leading end of an elongated article being transported along said axis for operating said valve means to subsequently admit pressured fluid to said piston means only upon interposition of that elongated article between said article-engaging members.

5. Apparatus adapted for axially transporting pipe sections along a selected horizontal axis and comprising: conveyor means cooperatively arranged for successively transporting pipe sections axially along said axis; means selectively operable for propelling pipe sections along said conveyor means and including first and second rollers adapted for relative rolling movement along circumferentially-spaced longitudinal surfaces of pipe sections being transported on said conveyor means, means operatively supporting said rollers for transverse movement in relation to said axis, motive means selectively operable for rotatively driving at least one of said rollers, and piston-actuating means coupled to said rollers; and control means adapted for normally positioning said rollers at selected relative positions and responsive only upon transverse outward movement of said rollers from their said selected positions by interjection therebetween of a pipe section being transported along said conveyor means for subsequently admitting a pressured fluid to said piston-actuating means to bias said rollers inwardly into frictional engagement with such longitudinal surfaces of such a pipe section for further transportation thereof along said conveyor means by said rotatively-driven roller.

6. The apparatus of claim 5 wherein said control means include: normally-closed valve means; and actuating means adapted to open said valve coupled to said rollers and responsive only to outward transverse movements thereof for opening said valve means to admit a pressured fluid to said piston-actuating means.

7. A The apparatus of claim 5 wherein said control means include: normally-closed valve means; pressure-responsive actuating means adapted for selectively opening said valve means to admit a pressured fluid to said piston-actuating means; pressure-developing means coupled to said rollers and responsive only to outward transverse movements thereof for developing pressures corresponding to such movements; and means operatively coupling said pressure-developing means and said pressure-responsive actuating means for transmitting developed pressures therebetween for opening said valve means following outward movements of said rollers to admit a pressured fluid to said piston-actuating means.

8. Apparatus adapted for axially transporting pipe sections along a selected horizontal axis and comprising: conveyor means cooperatively arranged for successively transporting pipe sections axially along said axis; means selectively operable for propelling pipe sections along said conveyor means and including first and second opposed rollers adapted for relative rolling movement along diametrically-spaced longitudinal surfaces of pipe sections being transported along said conveyor means, means operatively supporting said opposed rollers for transverse movement in relation to said axis, and motive means selectively operable for rotatively driving at least one of said opposed rollers; and means selectively responsive only to interposition of a pipe section being transported along said conveyor means between said opposed rollers for biasing said opposed rollers inwardly into frictional engagement with such longitudinal surfaces of such pipe sections for further transportation thereof along said conveyor means by said rotatively-driven roller.

9. The apparatus of claim 8 wherein said selectively-responsive means are comprised of: piston means operatively disposed between said opposed rollers and including a transversely-oriented piston cylinder closed at one end and open at the other end, a piston member having an enlarged portion slidably disposed in said piston cylinder for movement therein and a reduced transversely-oriented portion extending out of said open end of said piston cylinder, and first and second sealing means respectively fluidly sealing said piston cylinder relative to said enlarged and reduced piston portions and defining first and second enclosed spaces in said piston cylinder between said enlarged piston portion and said closed and said open ends respectively; first means connecting said piston cylinder to said first roller for transverse movement thereby; second means connecting said reduced piston portion to said second roller for transverse movement thereby; valve means connected to said second enclosed space and adapted for selectively supplying pressured fluid thereto to bias said opposed rollers inwardly toward one another; valve-actuating means connected to said valve means and responsive to fluid pressure for selectively opening said valve means upon an increased fluid pressure and for closing said valve means upon a decreased fluid pressure; and conduit means operatively coupling said valve-actuating means and said first enclosed space for transferring fluids therebetween to open said valve means upon movements of said piston member in relation to said piston cylinder tending to decrease the volume of said first enclosed space and to close said valve means upon movements of said piston member in relation to said piston cylinder tending to increase the volume of said first enclosed space.

10. The apparatus of claim 9 further including: flow-restriction means in said conduit means for retarding transfer of fluids between said valve-actuating means and said first enclosed space.

11. The apparatus of claim 8 wherein said roller-supporting means include first and second depending axles respectively carrying said first and second rollers, first and second universal joints respectively dependently supporting said first and second axles, first and second shafts respectively supporting said first and second universal joints, and a support including transversely-spaced first and second bearings respectively journaling said first and second shafts; and said motive means include motor means, and power-transmission means operatively coupling said motor means and said first and second shafts and adapted to rotate said axles in opposite rotative directions.

12. The apparatus of claim 11 wherein said selectively-responsive means are comprised of: piston means transversely oriented and operatively interconnecting said first and second axles for transverse movement between extended and retracted positions in conjunction with inward and outward transverse movements of said opposed rollers, said piston means including a piston cylinder journaled to said first axle and a piston member journaled to said second axle and slidably sealed in said piston cylinder to define an enclosed space therein adapted to receive a pressured fluid for moving said piston cylinder and said piston member toward one of their said positions to bias said opposed rollers inwardly; conduit means connected to said enclosed space; valve means in said conduit means and selectively movable between a first position adapted to open said enclosed space and a second position adapted to supply a pressured fluid to said enclosed space; and valve-actuating means interconnecting said piston means and said valve means for normally maintaining said valve means in said first position and responsive to movement of said piston cylinder and said piston member toward the other of their said positions for moving said valve means to said second position.

13. The apparatus of claim 11 wherein said selectively-responsive means are comprised of: piston means transversely oriented and operatively interconnecting said first and second axles for transverse movement between extended and retracted positions in conjunction with inward and outward transverse movements of said opposed rollers, said piston means including a piston cylinder journaled to said first axle and a piston member journaled to said second axle and slidably sealed in said piston cylinder to define first and second enclosed spaces therein; first and second conduit means respectively connected to said first and second enclosed spaces; valve means in said first conduit means and selectively movable between a first position adapted for venting said first enclosed space to allow said piston means and said opposed rollers to move freely outwardly and a second position adapted for supplying a pressured fluid to said first enclosed space to bias said piston means and said opposed rollers inwardly; valve-actuating means including fluid-displacement means operatively coupled between said second conduit means and said valve means and adapted to confine a constant volume of a pressure-transmitting medium in said second enclosed space, said second conduit means, and said fluid-displacement means; spring means normally urging said opposed rollers and said piston means inwardly to displace such a pressure-transmitting medium from said second enclosed space into said fluid-displacement means for normally maintaining said valve means to said first position; and means normally biasing said valve means toward said second position to displace such a pressure-transmitting medium from said fluid-displacement means to said second enclosed space upon outward movement of said opposed rollers and said piston means by interjection of a pipe section between said opposed rollers.

14. Apparatus adapted for axially transporting pipe sections along a selected horizontal axis and comprising: conveyor means cooperatively arranged for successively transporting pipe sections axially along said axis; means selectively operable for propelling pipe sections along said conveyor means and including first and second pairs of opposed rollers longitudinally spaced along said conveyor means and adapted for relative rolling movement along circumferentially-opposed longitudinal surfaces of pipe sections being transported on said conveyor means, means operatively supporting said rollers and transverse movement in relation to said axis, and motive means selectively operable for rotatively driving at least one of each pair of said rollers; and first and second means respectively responsive only after movement of a pipe section being progressively transported along said conveyor means between each pair of said rollers for biasing in turn said first and second pairs of opposed rollers inwardly into frictional engagement with such longitudinal surfaces of such pipe sections for further transportation thereof along said conveyor means by said rotatively-driven rollers.